Oct. 25, 1949.    H. B. REX    2,485,657
ELECTRICAL INSTRUMENT WITH ELECTROMAGNETIC FEEDBACK
Filed July 23, 1948    3 Sheets-Sheet 1

INVENTOR
HAROLD B. REY
BY
ATTORNEY

Oct. 25, 1949.    H. B. REX    2,485,657
ELECTRICAL INSTRUMENT WITH ELECTROMAGNETIC FEEDBACK
Filed July 23, 1948    3 Sheets-Sheet 2

INVENTOR
*HAROLD B. REX*
BY
ATTORNEY

Oct. 25, 1949.        H. B. REX        2,485,657
ELECTRICAL INSTRUMENT WITH ELECTROMAGNETIC FEEDBACK
Filed July 23, 1948        3 Sheets-Sheet 3
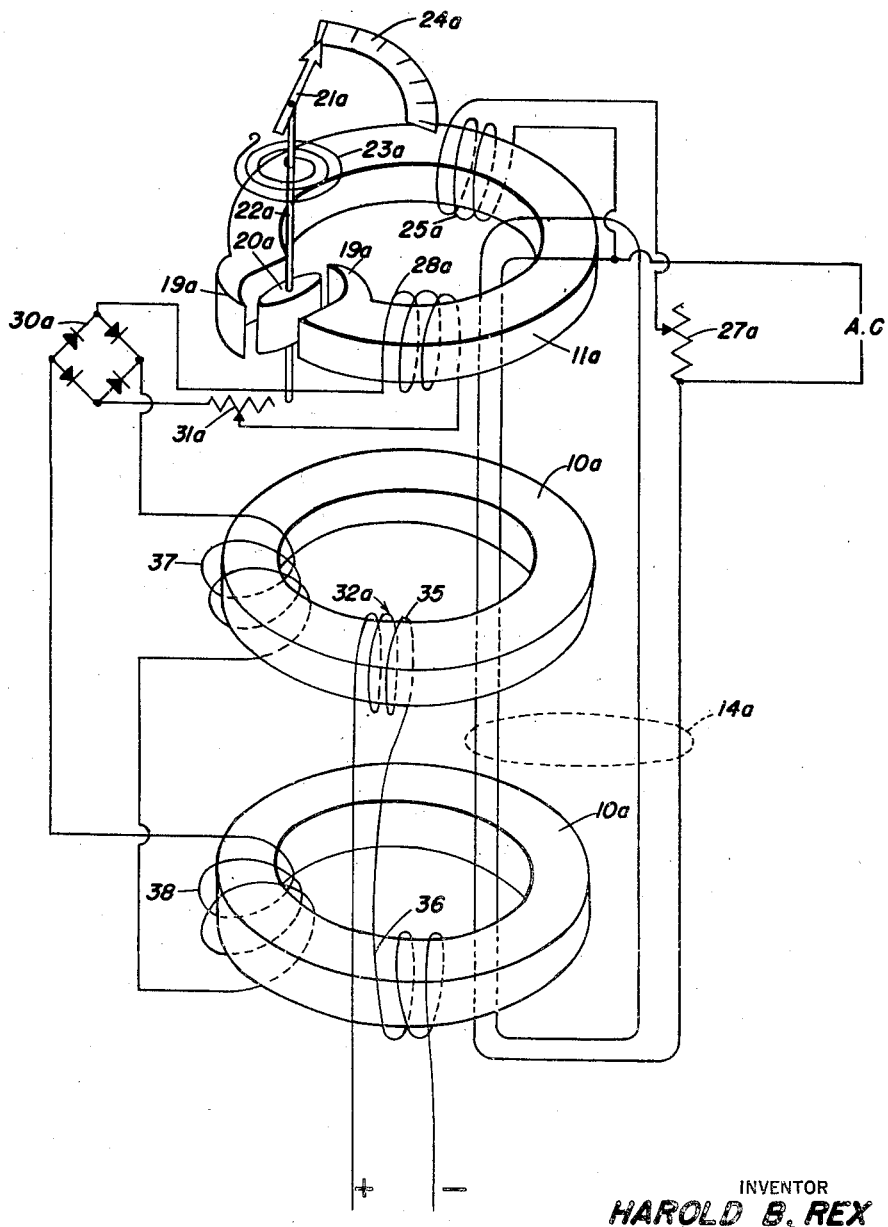
INVENTOR
HAROLD B. REX
BY
ATTORNEY Patented Oct. 25, 1949

2,485,657

UNITED STATES PATENT OFFICE 2,485,657

ELECTRICAL INSTRUMENT WITH ELECTRO-MAGNETIC FEEDBACK

Harold B. Rex, Falls Church, Va.

Application July 23, 1948, Serial No. 40,412

9 Claims. (Cl. 171—95)

(Granted under the act of March 3, 1883, as amended April 30, 1928; 370 O. G. 757)

This invention relates to improvements in electrical measuring or indicating instruments of the dynamometer or movable-vane type, the specific instrument disclosed herein making use of the magnifying effect of the electrical current in a feedback circuit which links the core components of the instrument, to enable the measurement of electrical currents of minute values.

In the adaptation of the dynamometer principle of electrical measurement, use is made in this instrument of companion cores of different magnetic permeabilities, the control of the magnetic saturation of the core of greatest permeability, that is to say, the extent of saturation of said core by the current to be measured, being the factor that disturbs the magnetic equilibrium of the core of lesser permeability, and so produces a scale reading by means of a pointer that is affected by the disturbance.

The value of the scale or indicator reading is the direct result of an amplifier action which occurs in the foregoing feedback circuit which, because of the fact that it links the core components of the instrument, is sensitive to the least change in potential of the direct current which is to be measured, and so becomes the instrumentality whereby a magnified reading is produced on said scale. In order to understand the extent of departure of the invention from the most nearly related measuring instrument, it is thought desirable to briefly outline the general structure and principle of the latter. That type of instrument has a fixed coil which, when energized, produces a magnetic field. A vane occupying said field is influenced by fluctuations in said field, so that an attached pointer is caused to move one way or the other across a suitably calibrated scale and so indicate the strength of the current that produces the field.

An instrument of the foregoing characteristics is commonly acknowledged as being adequate for ordinary commercial power frequency readings, but it lacks adaptability to measuring currents in minute values. It is that adaptability which identifies the improvement in the instant instrument, and it is therefore one of the objects of the invention to provide an instrument capable of indicating minute currents or minutely varying currents.

Another object of the invention is to provide an electrical measuring instrument that contains integrally within itself, a means for amplifying the current to be measured.

Another object of the invention is the provision of an electrical measuring instrument wherein there can be identified a relay element or magnetic reactor, the saturation of which both brings about the detection of the minute current to be read and amplifies it to an extent whereat it can be easily read.

A further object of the invention, and one which follows what has already been stated, is to contrast a core of highly magnetically permeable material with a core of medium magnetic permeability in an instrument of the type disclosed, for the purpose in most instances of feeding back from the latter to the former a portion of the magnetizing force in such a way as to impart to the instrument a high degree of sensitivity.

Other objects and many of the attendant advantages of this invention will be readily appreciated as the same becomes better understood by reference to the following detailed description when considered in connection with the accompanying drawings wherein:

Fig. 5 is a schematic perspective view of a modification directly related to the structure in Fig. 2.

Figure 1:
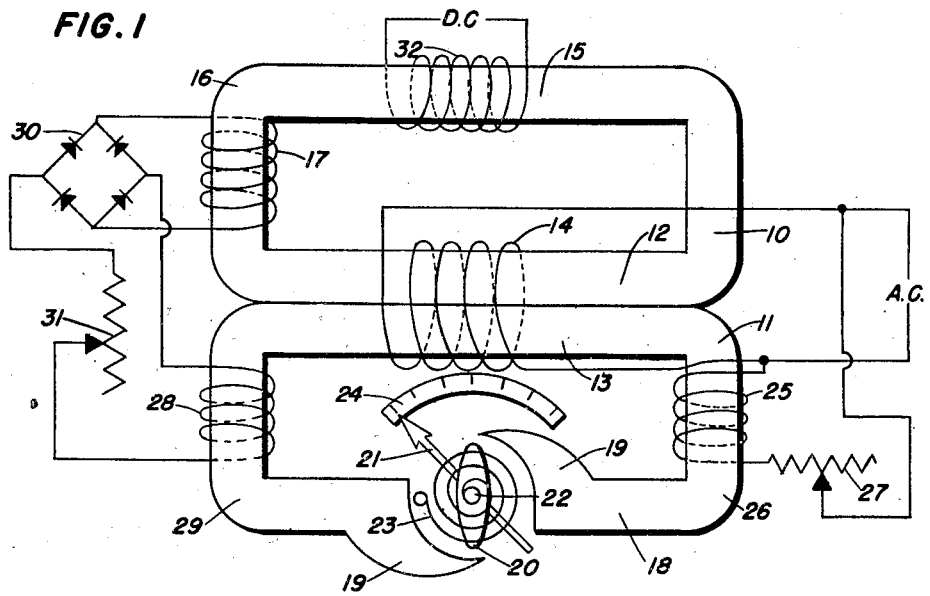
Fig. 1 is a schematic diagram of one form of the invention.

Reference is first made to Fig. 1 wherein 10 and 11 indicate companion metal cores which are so related in respect to each other as to place the portions 12, 13, thereof back to back or one above the other as presently described in conjunction with Fig. 5. The cores are secured together in this relationship by any suitable means. A coil 14 of wire is commonly wound on the contiguous portions 12, 13, its terminals being connected to a source of alternating current as indicated. The core 10 includes a second portion 15 matching the portion 12, and a pair of connecting ends, the end 16 having a flux magnifying coil 17 wound thereon.

The core 11 includes a second portion 18 matching the part 13, from which it differs, however, by being split and so shaped at the split to provide pole faces 19. The alternating current field traversing the gap between the pole faces is occupied in part by the vane 20 of a pointer 21, both being carried by a spindle 22 which is turnably mounted in suitable bearings. A spring 23, anchored at its ends to the spindle and to an adjacent fixture, is so tensioned as to tend to swing the pointer toward the zero position on a suitably calibrated scale 24 across which the pointer is movable.

A compensating coil 25 wound on the end 26 of the core 11 is connected in circuit with the alternating current source, the circuit of the coil 25 having connected in it an adjustable impedance 27 for regulating the current in the coil 25. Said coil is energized oppositely to the coil 14, and by properly proportioning the ampere turns thereof the net flux in core 11 can be reduced to zero. Therefore, the coil 25 is a zero-setting coil since its function is to cause the pointer to read zero at the beginning of a measurement of the current in what is conveniently termed a reference coil 32 wound on the outer longitudinal portion 15 of the core 10.

An amplifying coil 28 is wound on the end 29 of the core 11 and therefore responds with an alternating voltage proportional to the flux in core 11. This voltage is rectified at 30, and the derived direct current is adapted to flow in the previously mentioned magnifying coil 17. By the proper adjustment of an impedance 31 in the circuit of coil 28 the desired amount of feedback impressible on the coil 17 can be obtained. The adjustability of the impedance 31 makes it possible to control the feedback current, thereby providing a multi-range instrument.

The coil 32 is adapted to carry direct current which, in this illustration of the invention, is the current to be measured. The effect of the current flow in the coil 32 is to approach magnetic saturation of the core 10 to any desired degree, depending on the amount of D. C. carried by the coil. The core 10 is made of highly permeable and easily magnetically saturable material such as "Permalloy," "Mumetal" or pure iron. The core 11 is desirably made of magnetic material of medium permeability, such as silicon steel. But even if made of a material identical with that of the core 10, its magnetic permeability would be less than that of the core 10 because of the presence of the gap between the pole faces.

In operation, a source of alternating current is connected across the terminals of the coil 14. Since the permeability of core 10 is greater than that of core 11 it follows that most of the magnetic flux produced by coil 14 will be carried by core 10 and a little by core 11. Such flux occupying core 11 and tending to make itself evident by a deflection of the pointer 21 is neutralized by adjusting the impedance 27 until the net flux in core 11 is zero. The pointer 21 then reads zero on the scale 24, and the measurement of the current in the D. C. circuit is begun.

This is regarded as a minute current. By closing the D. C. circuit through coil 32 the additional magnetic flux thus produced in core 10 will upset the magnetic equilibrium in core 11 and cause a minute deflection of the pointer 21. The upsetting of the magnetic status of coil 11 by even so slight a degree will induce an alternating current in coil 28. This induced current is fed back in rectified form to the coil 17. There it magnifies the magnetomotive force of the core 10 and participates in a readjustment of the flux status of the cores 10 and 11 which will settle the pointer 21 at its true reading on the scale 24.

Figure 2:
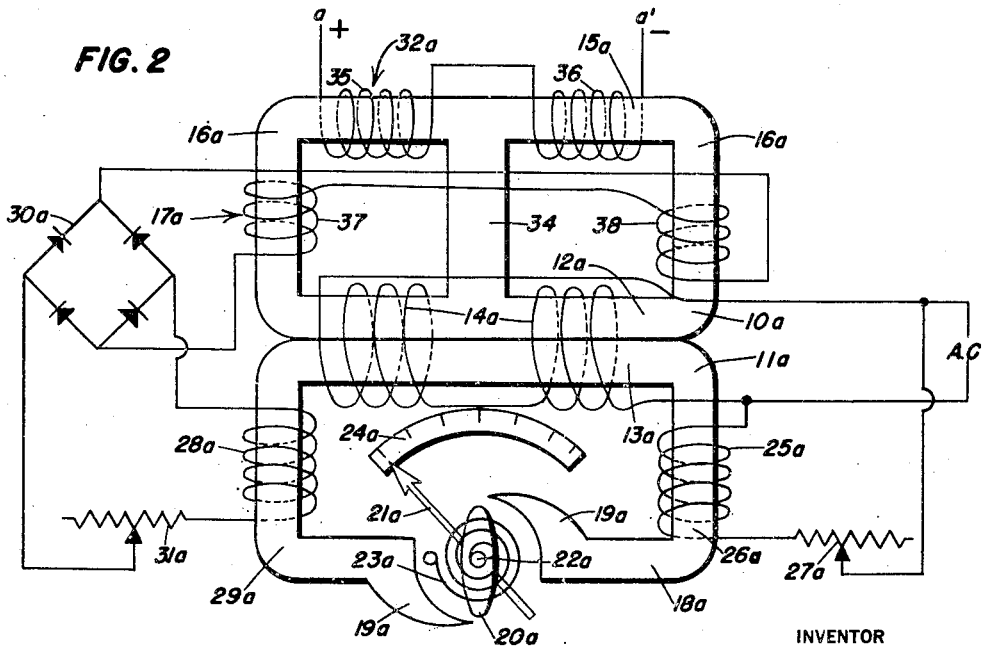
Fig. 2 is a schematic diagram of the first modification of the invention.

The modification shown in Fig. 2, as well as each of the succeeding modifications described below, is basically identical with the form in Fig. 1. Although it is classed as a modification it actually constitutes the principal form of the invention because of its symmetrical structure. Such parts therein as are identical with Fig. 1 are denoted by similar numerals with the addition of the exponent $a$. The principal difference between Figs. 1 and 2 is the provision of means in Fig. 2 for preventing any possibility of alternating voltage from appearing across the terminals here designated $a, a'$, of the direct current reference coil 32a.

A leg 34 joins the core portions 12a, 15a midway of the distance between the ends 16a. This structure provides for a division of flow of the magnetic flux, produced by the direct current flow in the oppositely wound components 35 and 36 of the coil 32a. These components are wound on the outer core portion 15a and are connected to the source of direct current which is to be measured. Because of the fact that the windings 35, 36 are opposed, they neutralize each other and prevent alternating voltages from appearing at the terminals $a, a'$.

The coil 14a is wound on the core portions 12a and 13a as before and, although divided by virtue of the necessity of skipping the leg 34, functions precisely as does the coil 14 in Fig. 1. The previously denominated amplifying coil 17 (Fig. 1) is divided into windings 37, 38, one of each being wound on the respective ends 16a of the core 10a.

In operation, current from an alternating source is adapted to energize the coils 14a and 25a, an adjustment of the impedance 27a serving to neutralize the effective flux in the core 11a until the pointer reads zero on the scale 24a. Direct current flowing through the components 35, 36 of the coil 32a produces clockwise and counterclockwise flux flows in the respective right and left ends of the core 10a, the effect of which is to again disturb the equilibrium of the flux status in the core 11a. Again there will be a minute deflection of the pointer 21a, the extent of which on the scale 24a is magnified by the feedback current derived from the amplifying coil 28a. The rectified current, in flowing through the windings 37 and 38 contributes to the clockwise and counterclockwise flux flow in the right and left ends of the core 10a, thereby augmenting the effective flux in the core 11a to move the pointer to that place on the scale indicating the true reading.

At this point it is desired to digress from the sequence of description of the modifications to point out the features of Fig. 5 which is so closely allied with Fig. 2 as to require the two to be considered together. The electromagnetic principles of Figs. 2 and 5 are identical. The sole difference lies in the cores on which the various coils are wound and their disposition relative to each other. The cores in Fig. 5 are toroids, and they are located one above the other in assembly. The reason for the three toroids is that the magnetically divided core 16a in Fig. 2 is separated into individual toroids which, to hold true to the previously stated identity are both indicated 10a.

The toroids 10a are thus equivalent to the core 10a (Fig. 2) of high permeability. By the same token the toroid 11a is equivalent to the core 11a (Fig. 2) of medium permeability. The coil 14a which in Fig. 2 consists of two connected windings, now (Fig. 5) becomes three coils in series, one coil on each of the toroids, bearing in mind that three components of the core structure are required to be electrically coupled according to Fig. 2. With the pointing out of these distinctions the description of Fig. 5 may be ended with the explanation that parts otherwise identical with Fig. 2 are denoted by corresponding reference characters. The description of the operation of Fig. 2 can and should be read on Fig. 5.

Figure 3:
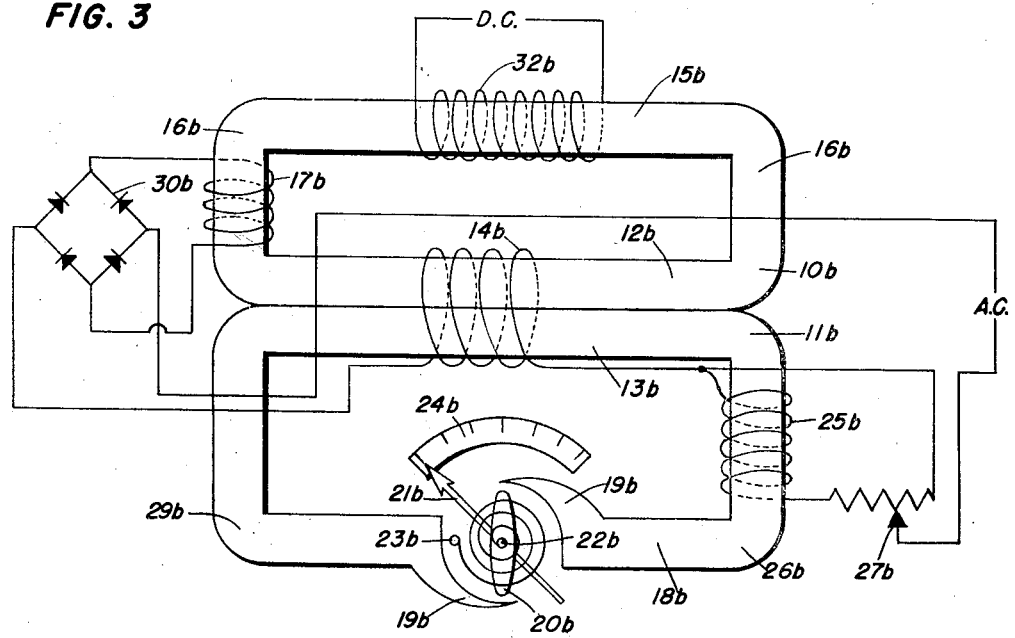
Fig. 3 is a schematic diagram of the second modification of the invention.

The modification in Fig. 3 employs the same core formation as in Fig. 1. Such parts as are identical in the two views are designated by corresponding numerals but with the exponent b. The coil 25b is now connected in series with coil 14b instead of in parallel as in Fig. 1. The coil 28 (Fig. 1) is omitted in Fig. 3, the rectifier 30b being connected in circuit with the coils 25b and 17b.

Figure 4:
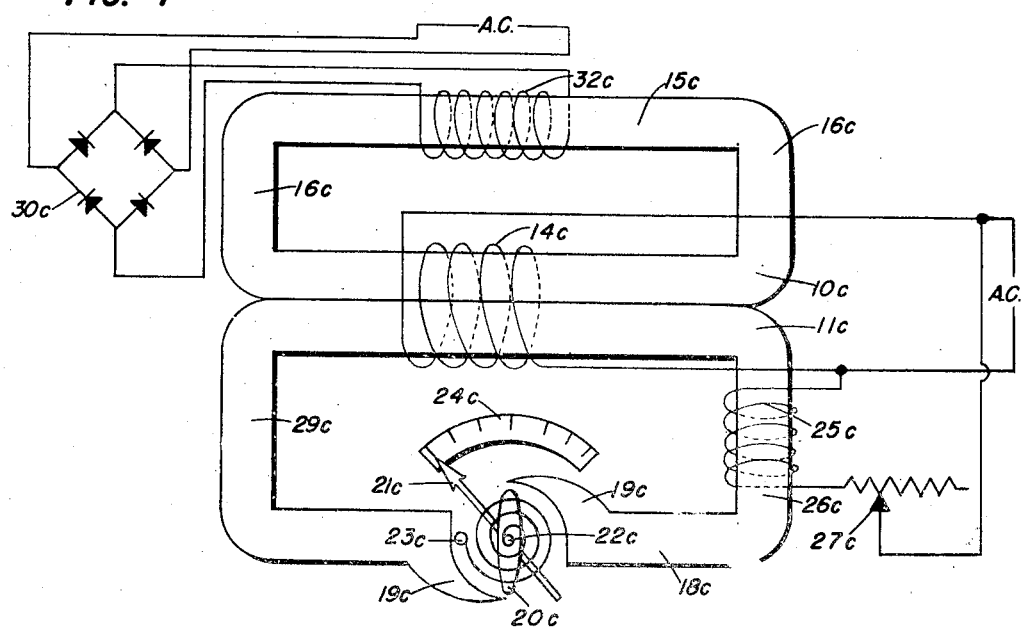
Fig. 4 is a schematic diagram of the third modification of the invention.

The modification in Fig. 4 in which the same core formation is employed as in Figs. 1 and 3, enables the arrival at the same result as the others, but illustrates that it can be accomplished by the omission of the coil 17. The rectifier 30c which derives current from an alternating current source as indicated, has its output connected directly to the winding 32c either in series as shown or, permissibly, in parallel. In this instance both the feedback coil 28 (Fig. 1) and the amplifying coil 17 are omitted to illustrate an instance wherein a reading can be produced on the scale 24c without involving regeneration.

In each of Figs. 3 and 4 the fundamental operation is the same as the operation already described for Figs. 1 and 2. The exception in Fig. 4 is that amplification of the flux flow in the core 10c is not obtained because of the omission of the feedback circuit which couples the cores 10, 11 through the medially connected rectifier.

As has been indicated, the pointer 21 will be extremely sensitive to small direct currents in the coil 32, and by proper adjustment of the control current in the winding 14 and of the other regulating parameters of the control circuits, the instrument may be made to amplify, in other words measure, minute currents over a great range.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. An electrical measuring instrument comprising contiguous cores of magnetic material respectively of high and medium magnetic permeability, a winding around adjacent portions of the cores binding them together electromagnetically and being energizable by an alternating current to magnetize both cores in proportion to their relative permeabilities, indicator means responsive to the flux flow in the core of medium permeability, zero-setting means for neutralizing the flux in said core available for operating said indicating means thereby to cause a zero reading of said indicator means, and a winding around another portion of the core of high permeability being energizable by direct current to upset the neutral status of the flux in the core of medium permeability and cause a reading at the indicator means.

2. An electro-magnetic detecting device comprising two adjacent magnetic cores, one core being composed of highly permeable material the other core being composed of material of medium permeability, means for neutralizing magnetic flux present in the core of medium permeability and confining a quantum of flux induced in the core of high permeability, a closeable circuit carrying a current to be read, being magnetically coupled to the core of high permeability to approach the saturation of said core in accordance with the amount of current carried by said circuit, a feedback coupling between the two cores, and indicating means responding first with a zero reading of the neutralized flux, second with a reading through the feedback coupling of the value of the current in the closeable circuit.

3. In an electro-magnetic device for measuring electrical current, a magnetic core of medium permeability, indicating means operable by flux traversing the said core, a second core of highly permeable material adjacent to the first core, means for linking both the said cores by the flux induced in the core of high permeability by the current to be measured, and means for controlling the degree of saturation of the said highly permeable core, whereby to control the proportion of flux that is to traverse the core of medium permeability to affect the indicating means.

4. An electrical measuring instrument comprising contiguous cores of magnetic material respectively of high and medium magnetic permeability, a winding common to both cores which winding is energizable by an alternating current to magnetize both cores in proportion to their relative permeabilities, indicator means responsive to the flux flow in the core of lesser permeability, means for neutralizing the flux flow in said core of medium permeability thereby to produce a zero setting of said indicator means, and a reference winding on the core of high permeability which winding is energizable by direct current to augment the magnetization of the core of high permeability, thereby to upset the magnetic equilibrium of the core of medium permeability and produce a concomitant reading at the indicator means of the value of the direct current.

5. An electrical measuring instrument comprising contiguous cores of magnetic material respectively of high and of medium permeability, a winding common to both cores which winding is energizable by an alternating current to magnetize both cores in proportion to their relative permeabilities, indicator means responsive to the flux flow in the core of medium permeability means for neutralizing the flux flow in said core of medium permeability thereby to produce a zero setting of said indicator means, a reference winding on the core of high permeability which winding is energizable by a direct current to augment the magnetization of the core of high permeability, thereby to upset the magnetic equilibrium of the core of medium permeability and produce a concomitant reading at the indicator means of the value of the direct current, and a feedback circuit linking the contiguous cores, the current induced in said circuit settling the flux status of the two cores and the reading of the indicator means.

6. An electrical measuring instrument comprising contiguous cores of magnetic material respectively of high and medium permeability, a winding common to both cores which winding is energizable by an alternating current to magnetize both cores in proportion to their relative permeabilities, indicator means responsive to the flux flow in the core of medium permeability, means for neutralizing the flux flow in said core of medium permeability thereby to produce a zero setting of said indicator means, a reference winding on the core of high permeability, said winding having oppositely wound components and being energizable by a direct current to be measured, the augmentation of the magnetization of the core of high permeability upsetting the neutral status of the flow in the core of medium permeability to produce a reading at the indicator means of the value of the direct current, and means for magnifying said reading comprising a feedback circuit linking the contiguous cores, said circuit consisting of a coil wound on each of similar portions of the contiguous cores and a rectifier constituting the connection between said coils.

7. An electrical measuring instrument comprising contiguous cores of magnetic material respectively of high and medium permeability, a winding common to both cores which winding is energizable by an alternating current to magnetize the cores in proportion to their relative permeabilities, a feedback circuit coupled with said winding consisting of a winding on a portion of the core of high permeability and a rectifier constituting the connection between the two windings, indicator means responsive to the flux flow in the core of medium permeability, means for neutralizing the flux flow in said core of medium permeability thereby to produce a zero setting of said indicator means, and a reference winding on the core of high permeability which is energizable by a direct current to be measured, the augmentation of the magnetization of the core of high permeability upsetting the neutral status of the flux in the core of medium permeability to produce a reading at the indicator means of the value of the direct current.

8. An electrical measuring instrument comprising contiguous cores of magnetic material respectively of high and medium magnetic permeability, a winding around adjacent portions of the cores being energizable by an alternating current to magnetize both cores in proportion to their relative permeabilities, indicator means responsive to the flux flow in the core of medium permeability, zero-setting means for neutralizing the flux in said core available for operating said indicator means thereby to cause a zero reading of said indicator means, a reference winding around another portion of the core of high permeability which is energizable by a direct current, and means supplying the direct current consisting of an alternating current source and a rectifier interposed between said source and the reference winding.

9. An electrical measuring instrument comprising a core formation including a component consisting of adjacent toroids of highly permeable material and a component consisting of a single toroid of a material of medium permeability, a winding consisting of serially connected coils on each of the toroids of both components which winding is energizable by an alternating current to magnetize the toroids in proportion to their relative permeabilities, indicator means responsive to the flux flow in the toroid of medium permeability, means coupled to the latter toroid for neutralizing the flux flow in said latter toroid to produce a zero setting of said indicator means, a reference winding on the component of high permeability, said winding consisting of coils wound on each of the toroids of high permeability and being energizable by a direct current to be measured, the resulting augmentation of the magnetization of the highly permeable component upsetting the neutral status of the flux in the toroid of medium permeability to produce a reading at the indicator means of the value of the direct current, and means for magnifying said reading comprising a feedback circuit linking the toroids of both components, said circuit consisting of coils wound on each of the toroids and a rectifier constituting the connection between said coils.

HAROLD B. REX.

REFERENCES CITED

The following references are of record in the file of this patent:

UNITED STATES PATENTS

| Number | Name | Date |
| --- | --- | --- |
| 2,272,772 | Hathaway | Feb. 10, 1942 |
| 2,352,242 | Apstein | June 27, 1944 |
| 2,388,070 | Middel | Oct. 30, 1945 |